United States Patent
Nikkanen et al.

(10) Patent No.: US 7,474,847 B2
(45) Date of Patent: Jan. 6, 2009

(54) METHOD AND SYSTEM IN DIGITAL IMAGING FOR ADJUSTING EXPOSURE AND A CORRESPONDING DEVICE

(75) Inventors: Jarno Nikkanen, Tampere (FI); Ossi Kalevo, Toijala (FI)

(73) Assignee: Nokia Corporation, Espoo (FI)

( * ) Notice: Subject to any disclaimer, the term of this patent is extended or adjusted under 35 U.S.C. 154(b) by 308 days.

(21) Appl. No.: 10/558,912

(22) PCT Filed: Jun. 14, 2004

(86) PCT No.: PCT/FI2004/050091

§ 371 (c)(1),
(2), (4) Date: Nov. 30, 2005

(87) PCT Pub. No.: WO2005/001563

PCT Pub. Date: Jan. 6, 2005

(65) Prior Publication Data

US 2007/0009253 A1 Jan. 11, 2007

(30) Foreign Application Priority Data

Jun. 30, 2003 (FI) .................................. 20035113

(51) Int. Cl.
  *G03B 7/00* (2006.01)
  *H04N 5/235* (2006.01)
(52) U.S. Cl. ........................ 396/213; 396/233; 348/362
(58) Field of Classification Search ................. 396/213, 396/233, 234; 348/216.1, 217.1, 229.1, 362–367, 348/603, 672, 673, 678, 687, 221.1; 356/213–236
See application file for complete search history.

(56) References Cited

U.S. PATENT DOCUMENTS

| 4,843,476 | A  | * | 6/1989 | Fujioka et al. | 348/365 |
| 5,194,960 | A  |   | 3/1993 | Ota | 358/228 |
| 6,080,104 | A  | * | 6/2000 | Ozawa et al. | 600/180 |
| 6,486,915 | B2 | * | 11/2002 | Bell et al. | 348/362 |
| 6,518,998 | B1 |   | 2/2003 | Christoff et al. | 348/216.1 |
| 6,667,765 | B1 |   | 12/2003 | Tanaka | 348/229.1 |
| 2002/0039137 | A1 |   | 4/2002 | Harper et al. | 348/207 |
| 2002/0064297 | A1 | * | 5/2002 | Brunk et al. | 382/100 |
| 2003/0098914 | A1 | * | 5/2003 | Easwar | 348/229.1 |

FOREIGN PATENT DOCUMENTS

| EP | 0 219 658 A1 | 4/1987 |
| EP | 0 341 921 A2 | 11/1989 |
| EP | 0 810 551 A1 | 12/1997 |
| JP | 200059677 | 2/2000 |

\* cited by examiner

*Primary Examiner*—W. B. Perkey
*Assistant Examiner*—David M. Schindler
(74) *Attorney, Agent, or Firm*—Harrington & Smith PC

(57) ABSTRACT

The invention relates to a method in digital imaging for adjusting exposure, in which one or more exposure parameters (ET, AG) of a camera device are adjusted in connection with imaging. In the method, a histogram formed from a raw image frame (12) is analysed, from which one or more special values ($R_{high}$, $R_{low}$) are specified and which compared with a target level ($H_{tgt}$, $L_{tgt}$) set for them, and, if a special value ($R_{high}$, $R_{low}$) differs from the target level ($H_{tgt}$, $L_{tgt}$), the exposure parameters (ET, AG) are adjusted to achieve the target level ($H_{tgt}$, $L_{tgt}$).

15 Claims, 9 Drawing Sheets

Figure 1:
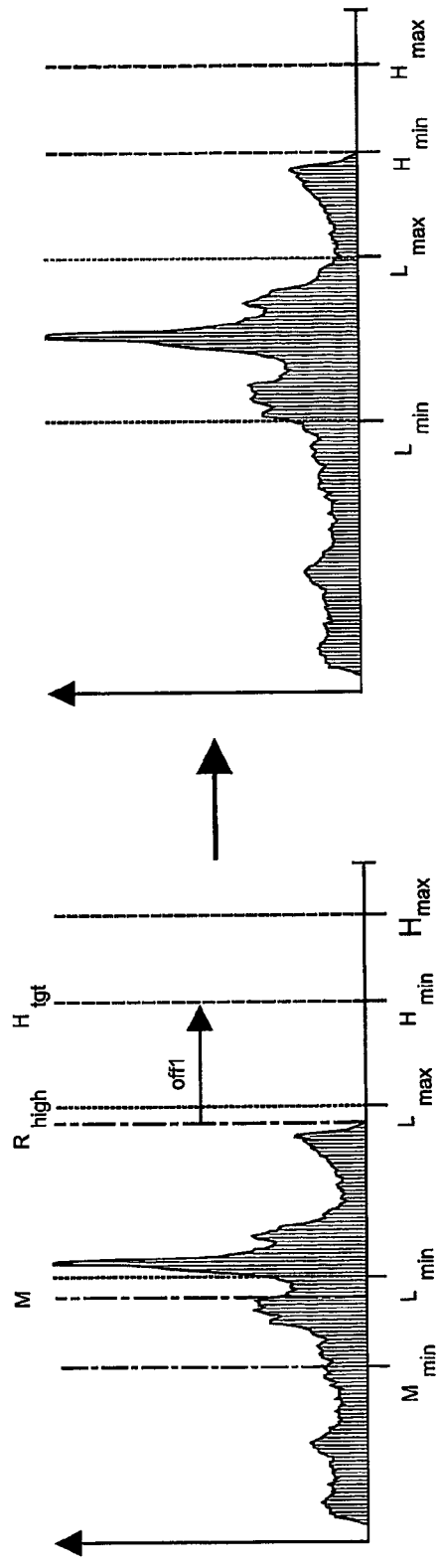

METHOD AND SYSTEM IN DIGITAL IMAGING FOR ADJUSTING EXPOSURE AND A CORRESPONDING DEVICE

The present invention relates to a method in digital imaging for adjusting exposure, in which one or more exposure parameters of a camera device are adjusted in connection with the imaging and in which method
(i)—a raw image frame corresponding to exposure parameters is captured from a camera sensor,
(ii)—a histogram is formed from the raw image frame,
(iii)—at least one characteristic value, for example, a mean value specified in a set manner, is specified from the histogram,
(iv)—the characteristic value is compared with a target level set for it,
(v)—if the said characteristic value differs from the target level set for it according to the set criterion, the exposure parameters are adjusted, in order to reach the target level and/or
(vi)—it is continued from stage (i).

In addition, the invention also relates to a corresponding system and a device.

The exposure of digital imaging devices, for example, digital cameras, or terminal equipment in general equipped with camera sensors, for example, mobile terminal equipment, is controlled, according to the prior art, on the basis of the mean brightness value of the pixel, or on the basis of some other similar essentially individual value. The mean value of the brightness value is specified from the pixels detected by the camera sensor. Each pixel indicates the brightness value that has been reflected to it from the object being imaged, or that has been emitted by the object being imaged.

A complementary modification for setting the exposure parameters in the case above is to take into account mainly the central areas of the sensor and to give, for example, the edge areas of the image less attention, if not no attention at all. Thus, the pixels in the central area of the sensor are given, for example, using a weighted mean value, a greater weighting value than that for the pixels in the edge areas. The motive for such an emphasis of the importance of the central area of the sensor arises from the object that it is intended to image being generally targeted more on the central area of the sensor than on its edge areas. Yet another alternative can be to select individual image spots from the viewfinder, the exposure being adjusted solely according to them. In this case, the other areas are not considered.

Solutions are known from the prior art, in which the exposure parameters are adjusted continuously according to the mean values of the histograms of the consecutive viewfinder frames, so that the mean value converges towards a specific fixed target level set for it. In other words, in this case, the exposure adjustment system tries to find exposure parameter values, such that the magnitude of the mean level of the brightness level of the image will equal that of the fixed target level.

However, a known, general problem of the mean-based automatic exposure control according to the prior art is that it requires a compromise to be made, firstly with the exploitation of the dynamic range of the sensor and, secondly with the risk of saturating the pixels. Thus, particularly in shots with a high contrast, an attempt must be made to fix the target level set for the mean value of the brightness value to a level that is sufficiently low to avoid saturating large numbers of pixels. On the other hand, such a compromise will inversely cause a disadvantageous exploitation of the dynamic range of the sensor in shots with normal contrast.

Simply on the basis on a mean value, it is impossible to know very much about a histogram formed from an image, i.e. what kind of distribution of the brightness values of the pixel values is detected at each pixel of the camera sensor. As is known, the histogram shows the number of brightness values of a shot as a function of the brightness values. Thus, two images, whose mean value is essentially the same brightness value, may have completely different characters, for example, in terms of the used dynamic range of the sensor.

If the adjustment algorithm of the exposure parameters that is applied functions poorly, it may lead to a significant loss of information (in the raw image). This lost information can no longer be restored in the imaging chain of the camera device, either because of saturated pixels, or because the dynamic range of the sensor is used inefficiently (the dark areas cannot be distinguished sufficiently).

As prior art, reference is made to U.S. Pat. No. 6,667,765 B1 (Minolta CO., Ltd.), in which the exposure is adjusted on a block basis. Triggering values that are applied to the image block areas are known from this publication. On the basis of them, blocks in a set manner as "dark" and "bright" are perceived and, on the basis of the number of them, the exposure can then be adjusted in an advantageous direction.

Other prior art is disclosed in U.S. Pat. No. 5,194,960 (Konica Corporation). This invention too applies specific fixed limit values and considers how great a portion of the pixels are brighter/darker than these limit values. On the basis of this, an attempt is made to make most of the image data to coincide with the middle of the dynamic range of the sensor. Even in this case, it is not possible to take the possible saturation of the pixels into account.

US-publication 2003/0098914 A1 (LightSurf Technologies, Inc.) discloses a method for adjusting the exposure, in which analysis takes place essentially of the raw-data of the first image frame that is formed in connection with the image capturing situation. For this reason, it is difficult to apply, for example, to the AEC-control of a viewfinder/video. The AEC-algorithm of the publication cannot be used for the viewfinder/video due to reason, because it requires the capturing of several frames to which different calculations (coarse calculation+fine calculation) relate. This would cause, for example, an irritating 'pumping' of the intensity level in a video, because the target level would vary, depending on the stage for which the exposure was calculated.

The present invention is intended to create a new type of method for adjusting exposure in digital imaging. The characteristic features of the method according to the invention are stated in the accompanying Claim 1. In addition to the above, the invention is also intended to create a corresponding system and device. The characteristic features of the system according to the invention are stated in the accompanying Claim 14 and those of the device in Claim 15.

In the method according to the invention, a histogram formed from the raw data frame formed by the camera sensor can be analysed and, on the basis of definitions made from it, a decision can be made as to the exposure parameters to be used—according to one embodiment, even entirely automatically. According to one embodiment, the analysis can be carried out continuously in a preset manner. Thus, the exposure parameters are updated dynamically and they guide special values specified from the histogram towards the target levels set for them. The method according to the invention can be carried out both before the imaging is performed and also during imaging.

The method according to the invention does not use one or several fixed target levels, instead the exposure parameters are always adjusted to be optimal, on the basis of the histogram formed from the raw data frame. The method according to the invention permits of the dynamic range of the camera sensor to be exploited effectively.

In addition, according to one embodiment, the use of the method according to the invention makes it possible to avoid unintentional saturation of the pixels. The method according to the invention also permits the control of imaging conditions that are quite different to, and independent of each other.

A first example of such imaging conditions is the processing of an imaging case with normal contrast. In this case, the dynamic range of the camera sensor is in all respects adequate for the dynamic range of the image shot, which thus does not affect the processing of more complex cases (and correspondingly in the opposite case too).

A second example of such an imaging case is the processing of an image, in which the dynamic range of the shot is too large to be completely covered by the camera sensor. This means that at least some of the pixels of the image shot may become saturated, in order to make the important areas sufficiently bright. On the other hand, if the important areas are at the bright end of the histogram, making them sufficiently dark will cause resolution attenuation of the darkest details, depending of course on the imaging conditions at the time in both cases. However, saturation can then be performed according to criteria preset for it, so that the pixels are not saturated unintentionally or uncontrollably.

The method according to the invention can be integrated quite simply in the imaging chains of both existing digital camera devices and those presently being designed. The use of the method according to the invention hardly increases the complexity of the imaging chain, at least to an extent that would be noticeably detrimental, for example, to the processing power or memory use of the equipment. The iteration frequency of the analysis may be adjusted on the basis of the set criterion. According to one embodiment, the implementation of the method, even on a purely software-level, can be very easily integrated in the imaging chains of devices including camera sensors.

Other features characteristic of the method, system, and device according to the invention will be apparent from the accompanying Claims while additional advantages achieved are itemized in the description portion.

Figure 2:
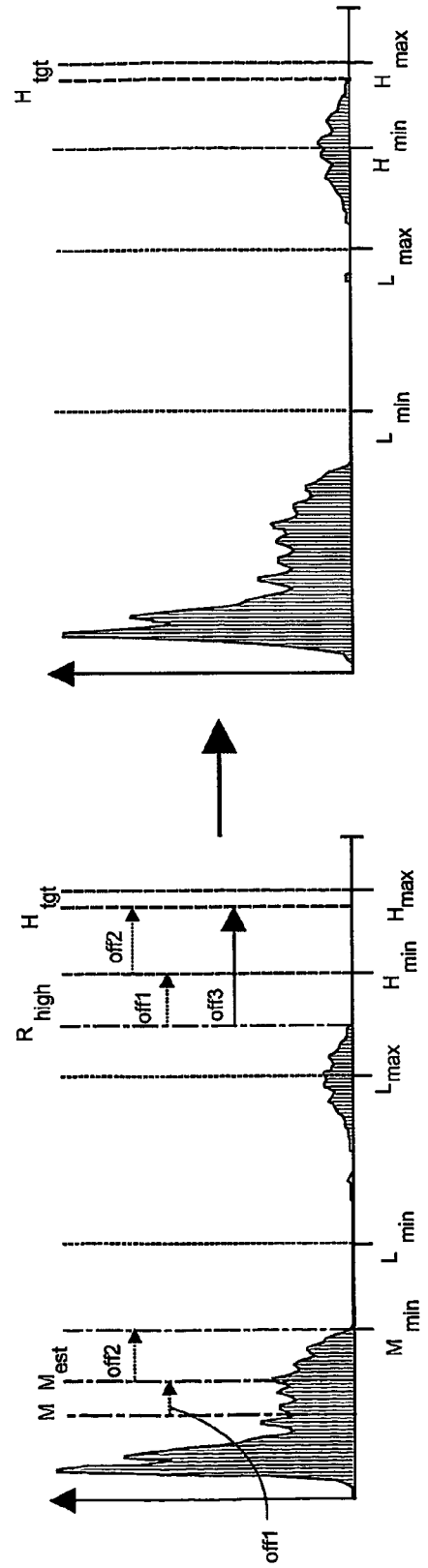
Figure 3:
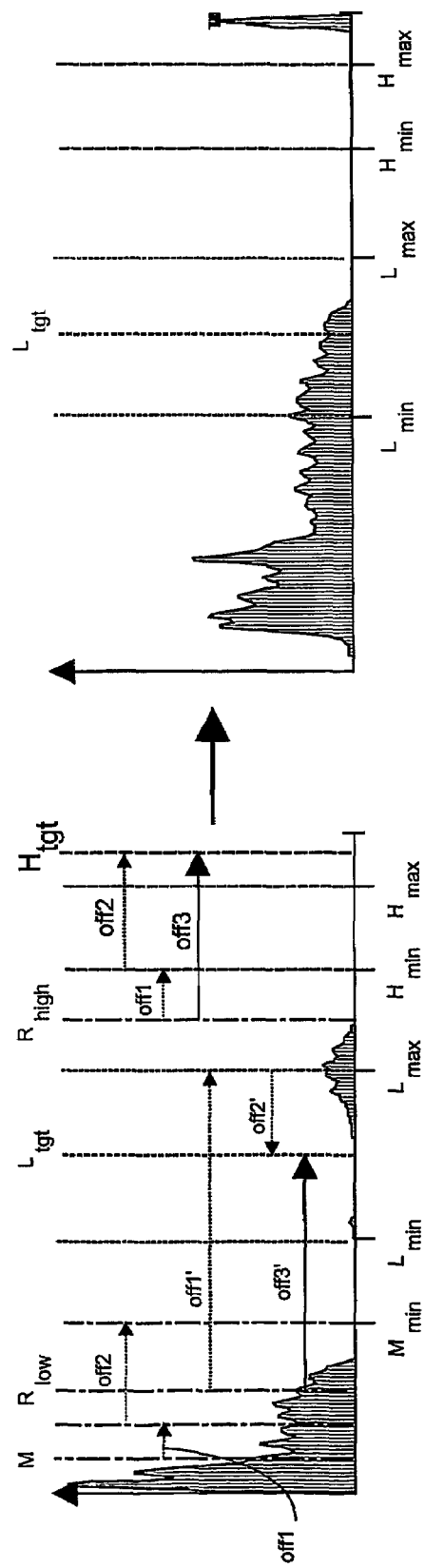
Figure 4:
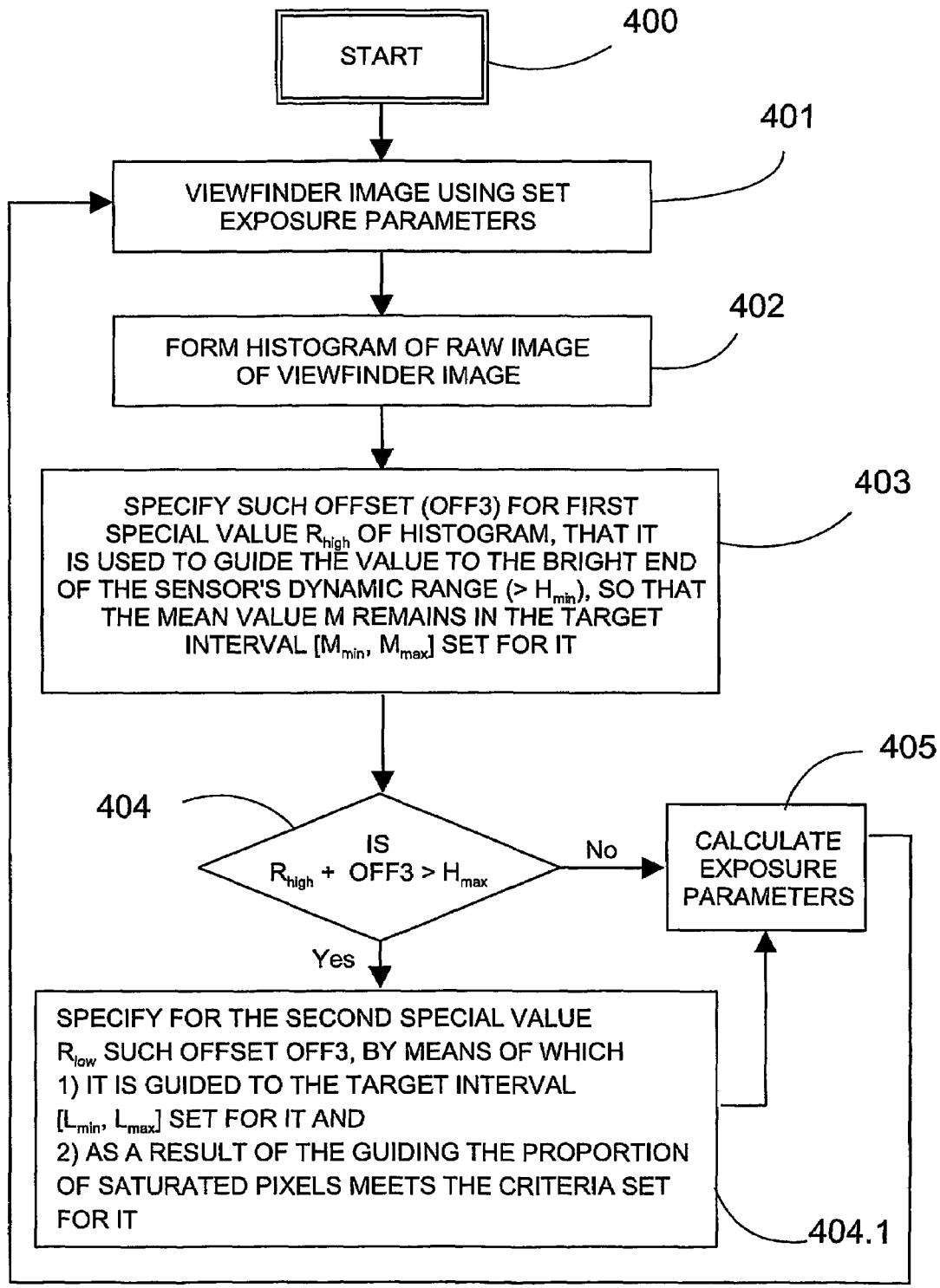
Figure 5:
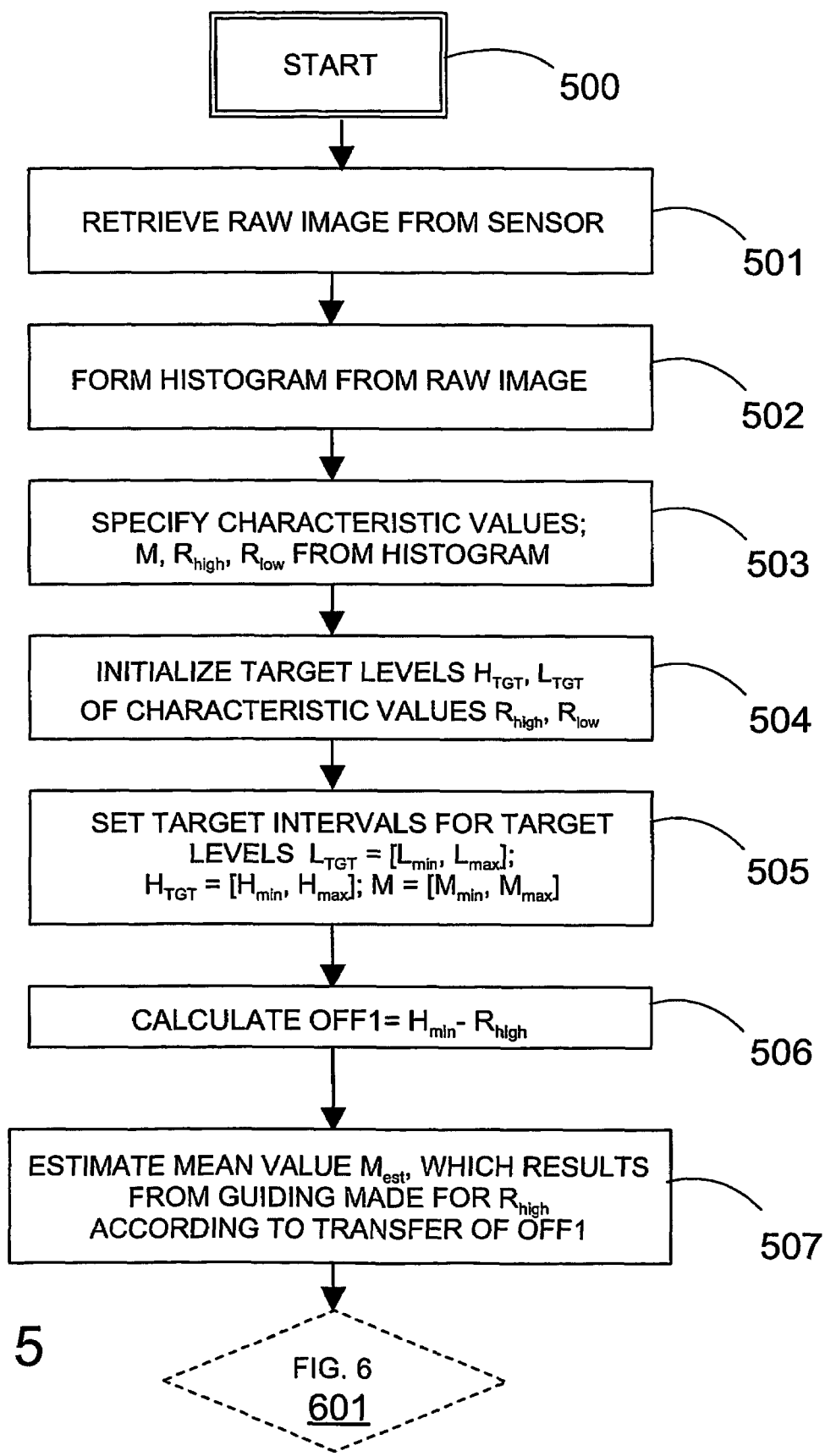
Figure 6:
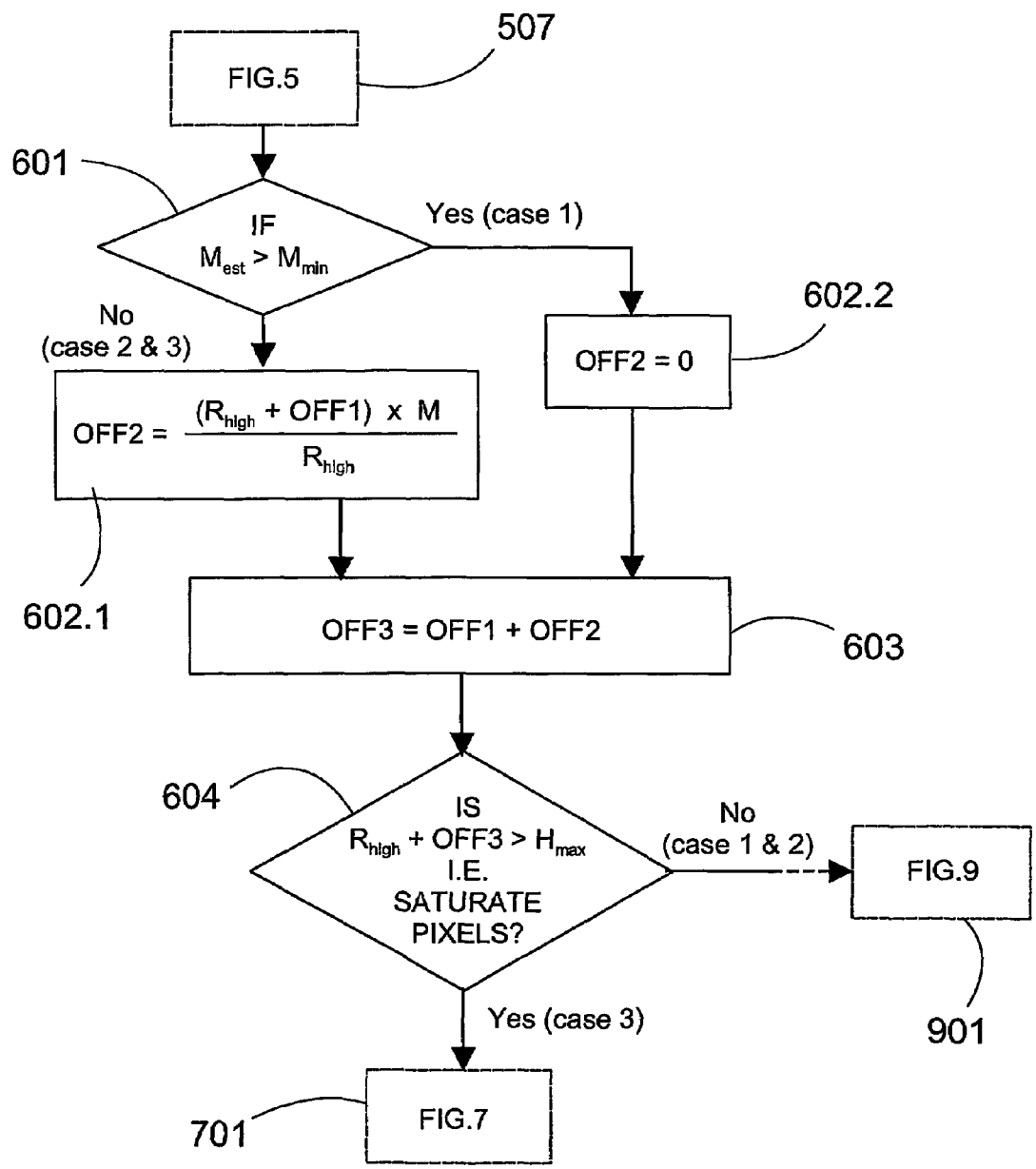
Figure 7:
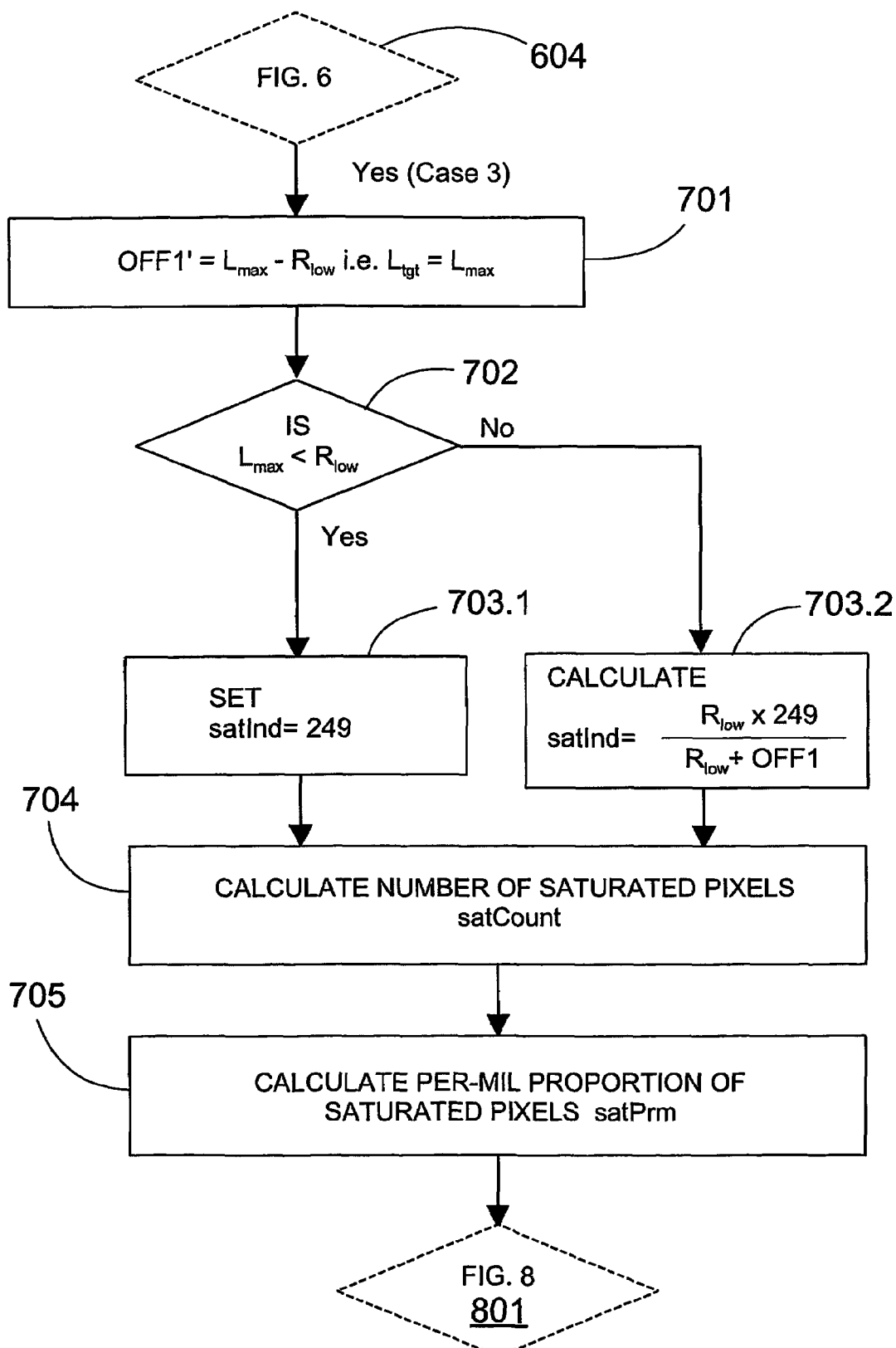
Figure 8:
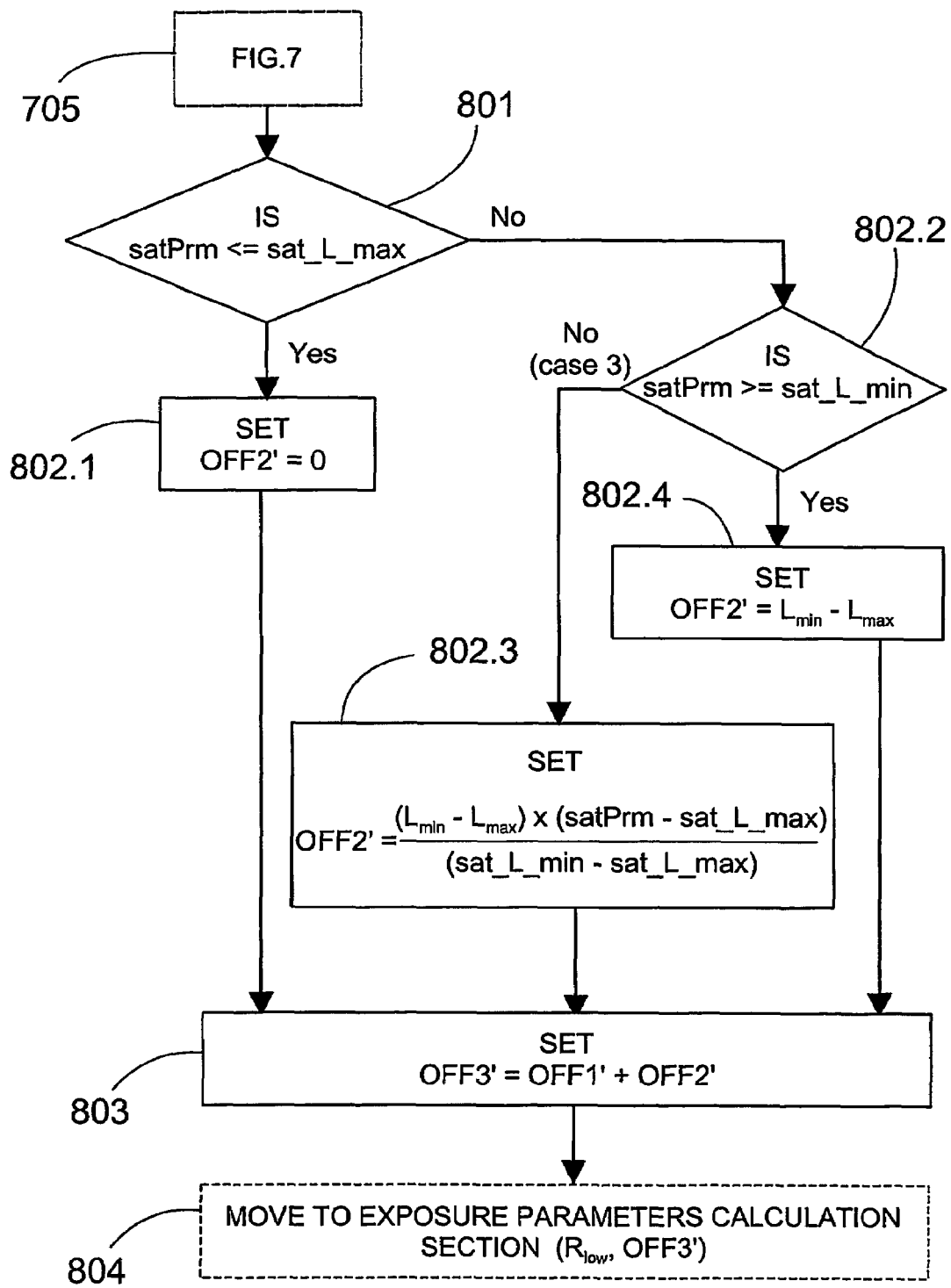
Figure 9:
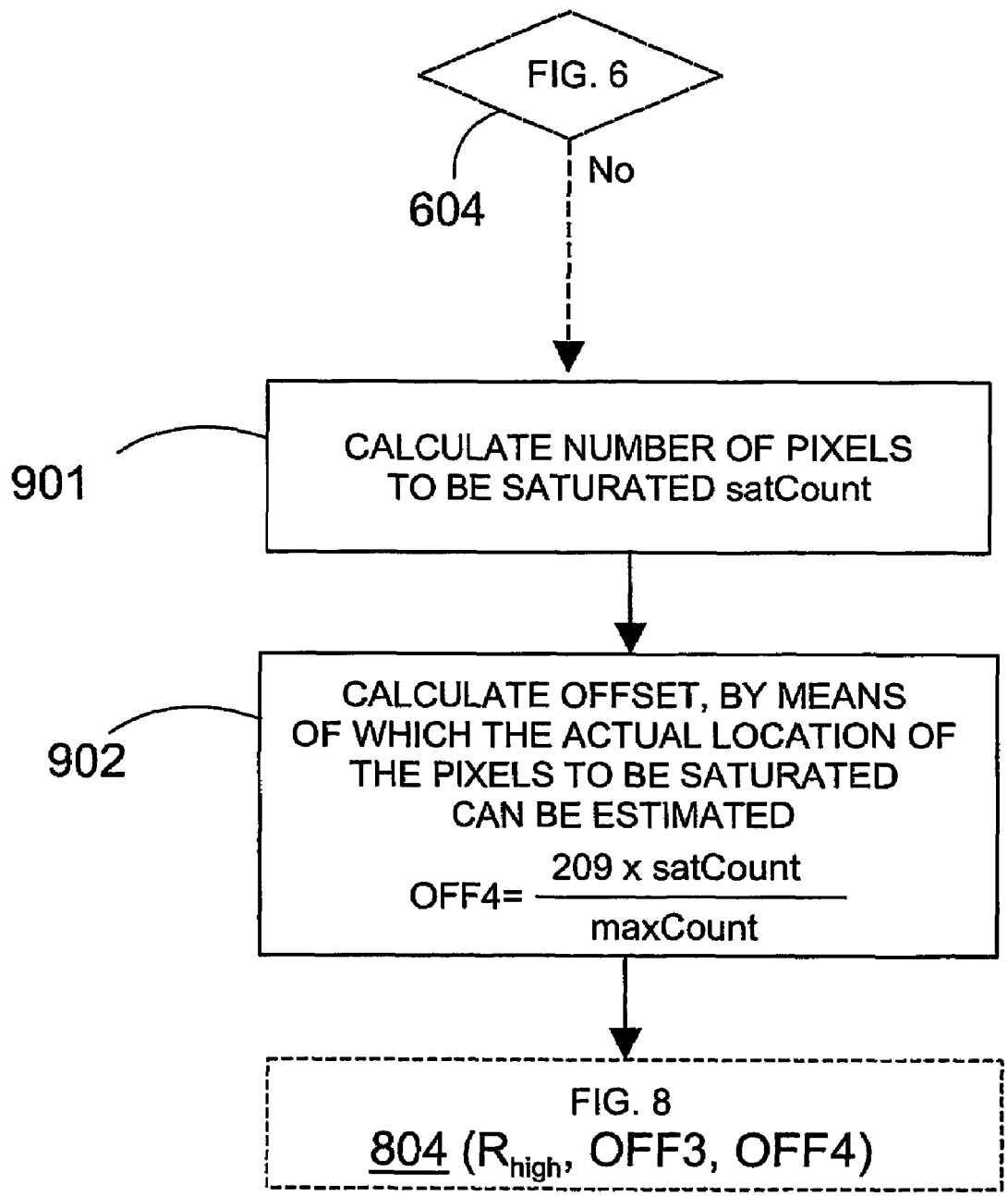
Figure 10:
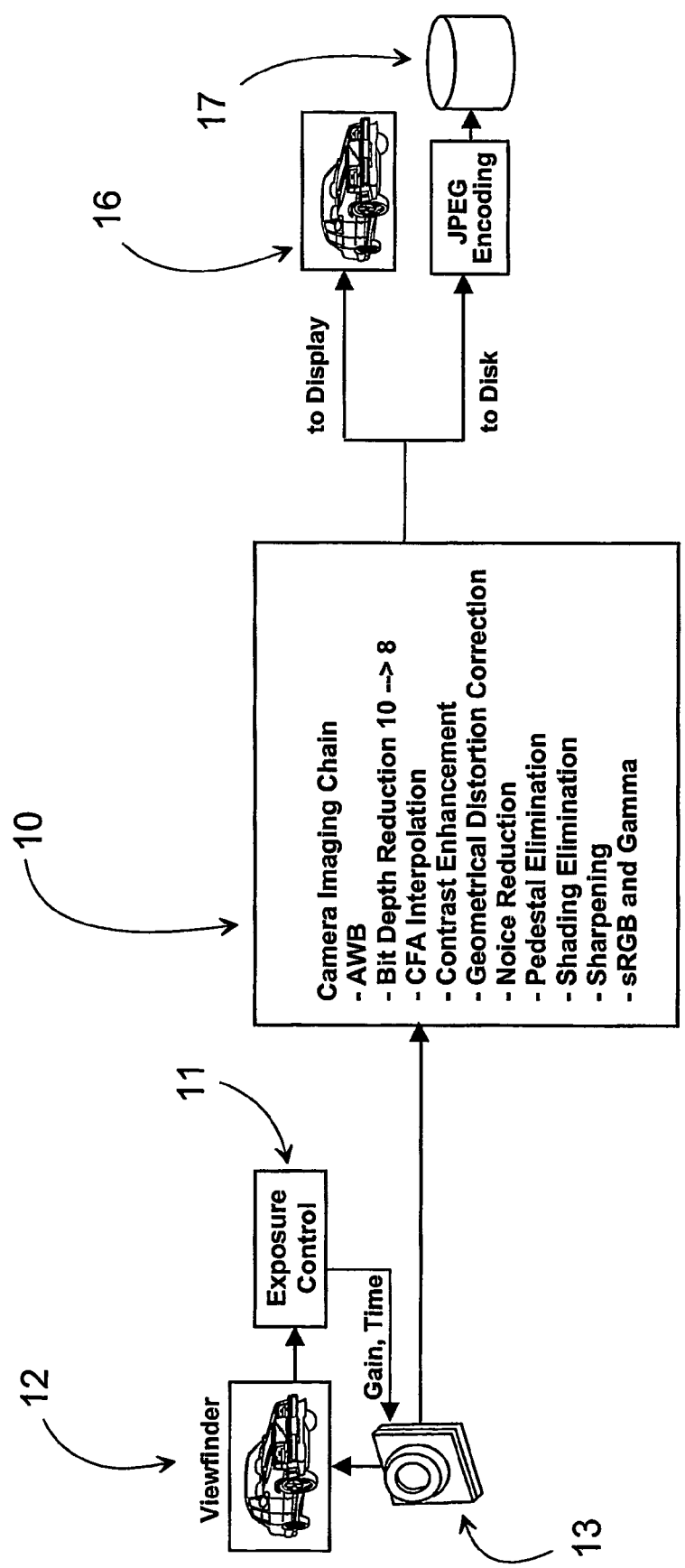

In the following, the method, system, and device according to invention, which are not restricted to the embodiments disclosed in the following, are examined in greater detail with reference to the accompanying drawings, in which FIGS. 1-3 show histograms of some image shots, when applying the method according to the invention, FIG. 4 shows the method according to the invention on a schematic level, as a rough flow diagram presentation, FIGS. 5-9 show flow-diagram presentations of some embodiments of the method according to the invention more precisely, and FIG. 10 shows a rough example of the location of the method according to the invention in the imaging chain of a digital device.

The method according to the invention, together with the optics and camera sensor of, for example, the imaging device, such as, for example, mobile terminal equipment including a digital camera or camera sensor, defines the properties of the raw image.

In its main features, the method forms a loop that is carried out, for example, within the device resources or imaging circumstances. In the loop, the raw image frame formed by the camera sensor is analyzed according to the method. Based on the analysis possible new values are set for the exposure parameters. The parameters are, for example, exposure time ET, and analog gain AG. By using the parameters the next raw image frame is captured by the camera sensor and the performance of the loop is continued from its beginning.

The loop can be performed in connection with the imaging. This refers to performing the method, for example, before recording imaging is performed i.e. when performing the shooting or also during the actual recording still/video imaging.

Though the invention is described in the following on mainly the method level it should be notice, the invention also relates to a corresponding system and device, in which means are arranged to implement the stages of the method, the means including, for example, a processor.

In the following, the method is described in the processing of three different image shooting cases. In terms of the method according to the invention, the shots are characterized by, but are in no way restricted to having large differences in contrast. On the other hand, differences in contrast may also be understood as large differences in pixel intensity levels. In exposure solutions according to the prior art, precisely in which a fixed target level is used, problems might arise in the situations according to image shots 1-3, in relation, on the one hand, to the exploitation of the dynamic range of the sensor and, on the other, to the risk of saturating the brighter pixels. When using the method according to the invention, there is no such fixed target level, the exposure parameters being instead specified at the time for each individual case.

The fixed target level according to the prior art means that also the raw images according to the image shots may remain too dark or too bright, if it is simultaneously wished to avoid the risk of saturation. This problem too can be resolved in a controlled manner, using the method according to the invention.

In the method according to the invention, characteristic values, such as, for example, a mean value or other possible statistical specific points, are specified from histogram formed from the raw image. In addition, special values specified in a set manner are further specified from the histogram formed from the raw image, their definition from a histogram being described later.

FIG. 4 shows a highly schematic, rough flow-diagram presentation of the method according to the invention. The central principle in the method is the analysis of the histogram formed from the data of the raw image frame and, on its basis, a search for exposure parameter values (405) (for example, exposure time and analog gain), such that the first special value ($R_{high}$) indicating the bright end of the histogram of the raw image frame would guide in the next raw image frame to a specific target level ($H_{tgt}$) set for it in a particular manner, at the bright end of the dynamic area (401-403). As a default value the very highest end of the dynamic area ($>H_{min}$) is not exploited, instead a small error tolerance is left there, to avoid data being guided to the non-linear area of the camera sensor (image shot in FIG. 1) (404, 404.1).

Now, if such a default direction were to be followed by a situation in which most of the pixels of the raw image frame were to be packed into the dark end of the dynamic area ($M<M_{min}$, i.e. the histogram's mean value M would drop too low), this situation can be detected from the histogram by calculation, even without waiting for an additional viewfinder frame. As a result of such a situation, the target level ($H_{tgt}$) set for the bright end can be corrected even further towards the brightest end of the dynamic area (image shot in FIG. 2).

Further, if the raw image frame has a contrast that is so great that the target level $H_{tgt}$ of the first special value $R_{high}$ reaches, due to the guiding, a specific maximum limit $H_{max}$, set for it, which once again can be detected without waiting for an additional viewfinder frame, it will then be possible, according to a first embodiment of the method of the invention, to make a decision to saturate some of the pixels in an advantageous controllable manner.

According to another embodiment, $H_{max}$ can be left undefined. This allows (in high contrast situations) some pixels to be saturated while maintaining minimum average level ($M_{min}$) of the raw data.

In the case of the first embodiment, the specific second special value $R_{low}$, specified, for example, from the histogram set according to the dynamic properties of the camera sensor, or a criterion known to be advantageous in terms of image processing, is guided to a lower target level $L_{tgt}=[L_{min}, L_{max}]$ set for it. The lower target level $L_{tgt}$ is specified from the number of pixels that would be saturated, if $R_{low}$, would be guided to $L_{max}$. Thus, the image shot shown in FIG. 2 forms a transitional stage between image shots shown in FIGS. 1 and 3. In the following, the method according to the invention is described in greater detail as one embodiment according to the flow-chart presentation shown in FIGS. 5-9 and with reference to the image shots shown in FIGS. 1-3.

When taking an image using a digital camera device, such as, for example, a digital camera, or in general an electronic device, such as, for example, mobile terminal equipment, including a camera sensor, the camera sensor is aimed at the object to be imaged (500). The light reflected or emitted by the image object is then detected by the camera sensor that is then digitalized in a manner that is, as such, known, in order to form a raw image of it (501). The raw image may be understand in this connection, for example, as a so-called unprocessed Bayer image.

In connection with the formation of the first raw image after powering up the camera, the camera device's electronics also provide initial values for the exposure parameters, for example, the exposure time ET and the analog gain AG, corresponding to the said Bayer image. According to the invention, these exposure parameters are then adjusted to achieve the most optimal exposure result as possible. The initial values of the exposure parameters ET, AG can be specified, for example, according to fixed default values set for the camera, or to an imaging program selected at the time, or in some other manner.

A histogram or a corresponding distribution profile is formed in the imaging device from the raw image obtained (502). The histogram can be, as such, of a known kind, in which the brightness values of pixels (or other values indicating the intensity of the pixels) are shown on the horizontal axis and the number of pixels or the corresponding pixel share corresponding to each brightness value is shown on the vertical axis. The horizontal axis of the histogram can be divided by, for example, the value 256, from 0 to 255. The darkest brightness value, which thus in practice corresponds to black, can be specified in the histogram to be the value 0, so that its place is at the lefthand edge of the histogram. The brightest brightness value, i.e. in practice white, is specified to be the value 255 and is located in the histogram at the right-hand end of the horizontal axis. Definition in the reverse manner is also possible, of course. In this connection, it should be stated that the mathematical analysis relating to the histograms, for example, the ways of calculating the related characteristics, or the associated rounding-off methods, will be obvious to one versed in the art, there being no need to describe in greater depth the details relating to them, in connection with the following description of the method.

In the method according to the invention, it is not essential to create a histogram presentation that is in any way complete. According to one embodiment, it is possible to exploit only a fraction of the digital data forming the raw image, by means of which it is nevertheless possible to cover essentially the entire image area of the sensor 13. According to one example of an embodiment, for a VGA resolution image it is possible to take only 0.25*0.25*640*480 values to the histogram. Generally, it can be stated that the bit depth of the pixels of a Bayer image depends, for example, on the sensor used. In the method according to the invention, it is possible to take, for example, only the 8 most significant bits from each pixel, so that in the corresponding histogram there can be 256 greytone values. The used histogram can also be even smaller (or bigger), the invention can be used with different sized histograms.

When applying the pixel-sampling procedure described above, it is possible to take into account, for example, only every fourth pixel from every fourth row of the camera sensor. In addition, this sampling stage can also include taking the various colour components (RGB) into account, which mode of operation is implemented several ways by one versed in the art, as is the collection of a histogram in general. According to one example of a collection method, if it is wished to ensure that nothing is accidentally saturated, the histogram is not collected directly from these brightness values that can be understood conventionally as the brightness values of the histogram in the manner referred to previously in this application. The brightness values forming the histogram can be selected, for example, so that they correspond to the brightest colour components belonging to each selected pixel neighbourhood.

Thus, the values can be taken from the raw image at essentially equal intervals, essentially the entire image area thus being taken into account. The pixels in the central area of the sensor can, for example, be given a greater weighting, without, however, in any way restricting the weighting area. Weighting the central area can be implemented, for example, automatically, if the Bayer image is not processed to remove darkening of the edge areas. Such an image that darkens towards the edge areas can appear, for example, when using undeveloped optics and it can be corrected, for example, by software means. If it is not wished to use central weighting, the darkening of the edge areas can be taken into account already when collecting the histogram.

Next, characteristic values, which are significant in terms of the method according to the invention, can be specified from the histogram formed from the raw image (503). One first example of such a characteristic value can be the special value $R_{high}$, which is set to indicate the brightest end of the histogram. $R_{high}$ can be set so that it does not lie at exactly the very brightest point of the histogram formed from the raw image, but slightly below this brightest point. One criterion for specifying the $R_{high}$ can be that 0.1-5%, preferably 0.1-2%, for example, 0.6% of the pixels forming the histogram are brighter than the brightness value corresponding to the point $R_{high}$. A one example nary meaning of value $R_{high}$ is to equalise the effect of noice at the brightest end of the histogram, which in its part can set up a suitable point for it on the histogram.

In pilot-stage analyses, this way of defining the brightness value corresponding to the point $R_{high}$ has been shown to be more error-tolerant than a search for the absolute right-hand edge of the histogram. This is because, for example, the "movement" of the histogram due to background noise may, in other cases, cause even large changes in the position of the detected edge between consecutive viewfinder frames, which is, in turn, undesirable from the point of view of the adjustment algorithm.

Further, prior to the point $R_{high}$, a second special value $R_{low}$, located below the corresponding brightness value can be specified from the histogram formed from the raw image. On the other hand, the operation of defining the point $R_{low}$ will not be necessary, if the viewfinder frame already has the desired type of dynamic, or it can be guided to be such without the risk of saturation. In fact, the definition of the point $R_{low}$ is related to precisely a saturation examination, which can also be implemented as one embodiment in the method according to the invention.

One manner of specifying the special value $R_{low}$ can be such that 5-35%, for example 10-30%, and preferably 20% of the pixels of the histogram are brighter than the point itself corresponding to it. In the disclosed image shots, the special value $R_{low}$ is particularly related to the image shot with a great difference in contrast and weighted to a single tone area, which histogram is shown in FIG. 3. In that $R_{low}$ plays a role corresponding to that of $R_{high}$ in the cases of the image shots shown in FIGS. 1 and 2.

Yet a third characteristic value, which can be specified from the histogram, is its mean value M, which can also be weighted. The definition of the mean value M can be weighted to take place, for example, from the darkest end of the histogram, in such a way that 75-95%, preferably 80-90%, for example 85%, of the pixels are taken into account, starting from the dark end of the histogram. The weighted or unweighted mean value M can be exploited, for example, in a possible portion of the method (not described) that improves its stability.

Thus, in the method according to the invention, the intention is to specify exposure parameters ET, AG, such that one or more characteristic value specified from the histogram will achieve the target level set for it. These target values can be set, for example, using image processing, or the dynamic characteristics of the sensor be taken into account as such, so that the shot will be made with optimized contrast and as balanced as possible. According to one embodiment, the saturation of the pixels can also be controlled using the set criteria. The following describes the target levels, the criterion values set for them, and the specification of the position of their values, on a histogram.

Thus, at least one or more target levels, or the target intervals formed by them can be set for the histogram (504, 505). One first example of such a target level can be the point $H_{tgt}$ located at the bright end of the histogram. One second example of a possible target level is the point $L_{tgt}$ located in the middle stage of the histogram. The target levels $H_{tgt}$ and $L_{tgt}$ can be defined dynamically in the manner according to the invention, so that they need not be fixed.

Thus, the intention is to guide the special value $R_{high}$ of the histogram to the target level set for it, by altering the exposure values. This guiding is also known as "mapping", to use the terminology characteristic of the field. If, as a result of the guiding of the special value $R_{high}$, a decision is made to saturate the pixels, the special value $R_{low}$ is guided to the target level set for it.

The intention is mainly to arrange the target levels $H_{tgt}$ and $L_{tgt}$ for the histogram, according to particular criteria. There can be, for example, two criteria for both target levels $H_{tgt}$, $L_{tgt}$, in which case the criteria points form their own target interval for the target level. In this connection, let the criteria points set for point $L_{tgt}$ be termed $L_{min}$ and $L_{max}$, and the target interval bounded by them $[L_{min}, L_{max}]$, and correspondingly the criteria points set for point $H_{tgt}$ be termed $H_{min}$ and $H_{max}$, and the target interval bounded by them $[H_{min}, H_{max}]$.

The following is a description of the positioning in the histogram of the criteria points formed for the target interval for these target levels $H_{tgt}$ and $L_{tgt}$, as one example of an embodiment (505). If the response of the camera sensor was linear over the entire dynamic range, $H_{max}$ could be set to the point MAX−1, in which MAX=256 in the case of the histogram image in question. However, in the case of known camera-sensor technology, the camera sensor's response is not quite linear at the extremes of the dynamic.

As a result of this, the point $H_{max}$ is positioned in the histogram to be slightly under the absolute maximum MAX−1. The point $H_{max}$ can be set so that it is 93-99% of the maximum MAX−1, preferably 96-98% of the maximum, for example 97% of the maximum, the brightness value corresponding to it then being 247.

Leaving $H_{max}$ slightly under the point MAX−1 will avoid, or at least reduce, in the system the instability that may appear in the vicinity of the point $H_{max}$. In such a situation, the results of calculation based on assuming linearity may, in certain cases, contain an excessive error arising from possible non-linearity, as the operations are now closer to the extreme end of the sensor's dynamic range.

In another embodiment, for example, in which a smaller error margin is needed, the effect of the non-linearity of the sensor can be estimated and included in the calculations.

The point $H_{min}$ is positioned in the histogram so that it is 70-90%, preferably 75-85%, of the maximum MAX−1, for example, 80% of the maximum, the corresponding brightness value then being 204. Such a setting will avoid the most non-linear part at the upper end of the camera sensor and provide a safety margin. An additional advantage, relating to exposure time and analog gain, and to which we shall return later in the description, will be gained. In the case according to the image shot shown in FIG. 1, an excellent image can be reconstructed, for example, from a Bayer image exploiting 80% of the dynamic of the camera sensor, 80% thus being a sufficiently large value in this case.

As stated already, if the nature of the shot demands also measures for using the target level $L_{tgt}$ specified from the histogram, an attempt is made to arrange this correspondingly for the target interval $[L_{min}, L_{max}]$. The point $L_{max}$ can be set so that it is $D*H_{min}$, in which D is in the range 0.6-0.9, for example 0.8. Thus, $L_{max}=0.8*H_{min}=64\%$ of the maximum, corresponding to the brightness value 163. The value 0.8 will depend on how $R_{low}$ is specified (20% of the pixels brighter than $R_{low}$). To the point of $L_{max}$ relates also the constant sat_L_max, the use of which in the method according to the invention is described later, which depicts the degree of saturation at the point $L_{max}$.

The point $L_{min}$ is set in the histogram, to be 20-40% of the maximum MAX, for example, 30% of the maximum, so that the corresponding brightness value is 76. To the point of $L_{min}$ relates also the constant sat_L_min, the use of which is also described a little later, which is used to set the degree of saturation at the point $L_{min}$.

Thus, the points $L_{min}$ and $L_{max}$ now specify the target interval for the target level $L_{tgt}$ (particularly in the image shot of FIG. 3), in the same way as the points $H_{min}$ and $H_{max}$ specify the target interval for the target level $H_{tgt}$ (particularly in the image shots of FIGS. 1 and 2).

According to one embodiment, all the target intervals and target levels can be adjusted dynamically according to the ambient light level. According to one embodiment the ambient light level can be estimated, for example, according to previously calculated exposure parameters ET, AG (the parameters that have been used to create the viewfinder image according to which the histogram has been gathered). As the estimated ambient light level decreases below a certain threshold level Thr_d1, the target levels and the target intervals are also decreased. The amount by which the target levels are decreased is a function of the distance of the estimated ambient light level from the threshold level Thr_d1 set for it. The function can be linear or piecewise linear, for example, so that the maximum decrease in the target levels is set at a certain light level Thr_d2. Of course, applying the static target levels is also possible.

Next, the method according to the invention is described at the algorithm level, as one embodiment, from stage (506) onwards. We start from the case of the image shot shown in FIG. 1, which describes all of the essential parts of the consecutive sub-stages. Correspondingly, the processing of the image shots shown in FIGS. 2 and 3 is described, starting from the point at which they diverge from the case according to the image shot shown in FIG. 1.

In the case according to the image shot shown in FIG. 1, the exposure situation is largely normal. The histogram is already quite balanced using the camera's prevailing exposure values, the weighted mean value M of the brightness values also being above the lower limit $M_{min}$ of the target interval set for it. In the method according to the invention, irrespective of the nature of the histogram formed from the raw image, the target level $H_{tgt}$ of the first special value of the histogram can be initiated in stage (504), for example, so that it is located at the point $H_{min}$. In all of the cases according to the imaging situations 1-3, this is followed by the calculation of the offset OFF1, which is required to guide the point $R_{high}$, indicating the bright end of the histogram, to the target level set for it, i.e. now to the point $H_{tgt}$ located at the point $H_{min}$ (506).

Next in the method according to the invention, it is possible to estimate the new mean value point $M_{est}$, which would be caused by the point $R_{high}$ carried out above being guided to the point $H_{tgt}$ (507). Now, if this estimated point $M_{est}$ of the mean value is greater than the lower-limit point $M_{min}$ of the target intervals set for the mean value M, as is now precisely so in the case according to the image shot shown in FIG. 1, the image is already sufficiently bright and it is set quite well in the dynamic range of the sensor (601). As a result of this, it is possible to set a second offset OFF2=0 (602.2) and move to stage (603).

In the simple cases according the image shot shown in FIG. 1, point $R_{high}$ need not be guided to a level higher than point $H_{min}$. This is because point $H_{min}$, is already at a sufficiently high level for it to be possible to process the raw image of image shot 1 to form an excellent final image. Some, but in no way restrictive advantages of not guiding point $R_{high}$ to a level higher than $H_{min}$, (unless this is essential) are, firstly, that the non-linear range of the sensor can thus be avoided with greater certainty and the adjustment algorithm made to function more accurately. Secondly, related to the previous point, that the safety margin can be increased, and thirdly, that, for example, the exposure time is not lengthened unnecessarily. An unnecessarily lengthened exposure time may, in turn, increase fuzziness due to the movement of moving subjects. Though of course part of the increase in the exposure time can be compensated by analog gain, on the other hand, if this is excessive, background noise from the amplification may enter the image. In other words, if it is wished to guide $R_{high}$ to the right, either the exposure time, or the analog gain, or both will have to be increased.

However, in the image shots shown in both FIG. 2 and in FIG. 3, due to the guiding made above according to the OFF1 offset, the new position point $M_{est}$ (507) of the estimated mean value will be, even after the conversion of point $R_{high}$ to the point $H_{tgt}$, lower than the target interval lower limit $M_{min}$ set for the mean value M (601). The second offset OFF2 is therefore specified for the first special value $R_{high}$ indicating the bright end of the histogram, by means of which the mean value M of the histogram is guided to the lower limit Min of the target interval set for it (502.1). Next, the offsets OFF1 and OFF2 are summed, giving a final offset OFF3, to guide the special value $R_{high}$, indicating the bright end of the histogram, to this new point $H_{tgt}$ (603).

Next in the method according to the invention, according to one embodiment, an analysis can be implemented, in which an investigation is made for possible saturation of pixels at the bright end of the histogram, caused as a result of the guidance previously carried out. The saturation is investigated by checking if the sum of the special value $R_{high}$, indicating the original bright end of the histogram, and the first offset OFF3 specified for it is greater than the upper limit $H_{max}$ of the target interval set for the bright end of the histogram (604).

If the condition stated above is not met, as is the case, for example, precisely in the image shots shown in FIGS. 1 and 2, it is possible to move essentially to the exposure time calculation section (804). However, prior to the actual exposure time calculation section (804), it is still possible to carry out a few sub-stages, relating, for example, to the investigation of stability (not shown).

FIG. 9 shows examples of sub-stages (901-902), which relate, for example, to a situation, in which the exposure parameters must be adjusted clearly downwards. Possible stability investigations (not shown) can be carried out prior to them. Situations requiring the downwards adjustment of the exposure parameters can arise, for example, when the camera has been initially aimed at a dark object, after which the user has aimed it at a bright object. The aiming at the dark object will have converged the exposure parameters to become relatively large. If the camera is then aimed at a bright object, the raw image using the prevailing exposure parameters will become too bright, or even completely white, i.e. the adjustment algorithm must rapidly adjust the exposure downwards.

In stage (901), the number of saturating pixels, which is depicted by the variable satCount, is specified. This is required to specify the offset OFF4, calculated in the following stage (902), is specified. The purpose of calculating OFF4 is to accelerate the convergence of the exposure, for example, in the situation depicted above.

Of course, the method according to the invention will function even without the specification of the offset OFF4, but several iteration cycles may then be required to find suitable exposure parameters in the case of the situation described above. There would then be no information on the mutual differences in brightness between the saturated pixels, so that it would also be impossible to completely estimate the desired adjustment. Using the offset OFF4, which can be understood as an adjustment-technical variable, thus improves this estimate.

From stage (902), it is possible to move to sub-stages, in which the exposure parameters ET, AG to be used in the following viewfinder frame, or in the final shot, are calculated (804). A new exposure time, converting the special value $R_{high}$ indicating the bright end of the histogram to the target level $H_{tgt}$ located in the target interval [$H_{min}$, $H_{max}$], is specified in the exposure calculation section (804). Thus, this is the exposure time ET that will create the desired guiding in the raw image formed from the following viewfinder frame and in its histogram. Part of the exposure time ET can be replaced with an analog gain AG, as may have to be done, for example, in the embodiments described later, if the exposure time ET is greater than the exposure time ET that can be, or which is desired to be set for the sensor 13.

When the user presses the trigger button, the exposure parameters ET, AG, which have been already previously arrived at using the method described above, are locked for carrying out still or video imaging. In the case of video imaging the method can also be performed, of course, during the imaging/recording process. In this case, the exposure conditions in the imaging situation can be taken into account as an almost real-time adjustment.

The above thus reviews a case according to the image shot shown in FIG. 1. The case shown in FIG. 1 was easy, in terms of the extent of the dynamic it contained.

The following is a description of the processing, according to the method of the invention, of a case according to the image shots shown in FIGS. 2 and 3. Thus, the substantive parts of sub-stages (500-601) have now been worked through, as in the case according to the image shot shown in FIG. 1. In the case of the raw images formed from the viewfinder frames of the image shots 2 and 3 in stage (601), which examines the positioning in the histogram of the estimated mean value $M_{est}$ caused by the special value $R_{high}$, indicating the bright end of the histogram, being guided to the lower limit $H_{min}$ of the target interval set for it, the result is that the condition $M_{est} > M_{min}$ is not valid in these cases. Due to this, a minimum offset OFF2, which is used to guide the mean value M of the histogram to the lower limit $M_{min}$ of the target interval set for it, is specified for the special value $R_{high}$ indicating the bright end of the histogram (602.1).

Next, the final first offset OFF3 is calculated again, in the same way as in the case of the image shot shown in FIG. 1 (603). Again, according to one embodiment, it is possible to investigate whether the guiding of the special value $R_{high}$ according to the first offset OFF3, which $R_{high}$ is indicating the bright end of the histogram, will exceed the upper limit $H_{max}$ of the target interval of the bright end (604).

In the case of the image shot shown in FIG. 2, the condition is not met and, as a result, after sub-stages 901-902, a move is finally made to stage 804 and the procedure continues in a similar manner to that in the case of image shot 1.

In the case of the image shot shown in FIG. 3, on the other hand, the result of this saturation condition investigation is true (604). Now, according to the method of the invention, it is decided to saturate some of the histogram' brightest pixels. The previously specified offsets OFF1, OFF2, OFF3 relating to the bright end of the histogram are rejected, and a move is made to examine the second special value $R_{low}$ and to find suitable guidance for it, which will allow the possible saturation of the pixels to be controlled in a preset manner.

Next, it is possible to specify the offset OFF1', which is required for guiding the special value $R_{low}$, specified from the lower end of the histogram, to the upper limit $L_{max}$ of the target interval set for it (701). Thus, the target value $L_{tgt}$ of the special value $R_{low}$ is now initialized to the point $L_{max}$. One motive for specifying the offset OFF1 in this manner is the fact that the number of pixels to be saturated can now be specified for the second special value $R_{low}$ in connection with the specified maximal conversion. An examination is next made as to whether the upper limit $L_{max}$ of the target interval of the target level $L_{tgt}$ is lower than $R_{low}$ (702). If the condition is true, satInd=249 is set as the boundary point of the pixels to be saturated.

Now, in the case according to image shot 3, this condition examination (702) is, however, not valid, as a result of which the boundary point satInd of the pixels to be saturated is specified in the original histogram, using the special value $R_{low}$, the offset OFF1' specified for it, and the upper limit $L_{max}$ of the target interval set for the special value $R_{low}$ (703.2). In the specification, the boundary point 249 of the pixels to be saturated is used in addition to these values, as it would be in the case of an unguided histogram. The specified point satInd is then used to calculate from the histogram the number of saturated pixels satCount (704) and then to specify the per mil proportion satPrm of saturated pixels, relative to the entire pixel amount maxCount of the histogram (705).

Once the per mil proportion of saturated pixels has been specified in a case, in which the special value $R_{low}$ of the lower part of the histogram would be guided, according to the offset OFF1', to the upper limit $L_{max}$ of the target interval, a move is made to specify an offset OFF2', such that by means of it the per mil proportion of pixels to be saturated can be preferably kept within the limits set for it (801-802). These limits can be specified for the upper and lower limits of the target interval of the second special value $R_{low}$, i.e. for the points $L_{min}$ and $L_{max}$. The per mil proportion of pixels to be saturated at the point $L_{max}$ can be set as sat_L_max=5-50‰, preferably 10-30‰, for example, 20‰. Correspondingly, at the point $L_{min}$, it can be set as sat_L_min=100-200‰, preferably 120-180‰, for example, 150‰.

Now, if satPrm<=sat_L_max, in which sat_L_max=20‰, is the preset limit value for the per mil proportion of pixels be saturated at the maximum point $L_{max}$ of the target interval of $R_{low}$ (801), it then becomes possible to set the offset as OFF2'=0 (802.1). This means that, when the point $R_{low}$ is guided to the target value $L_{tgt}$ set for it, which is thus now initialized to the upper limit $L_{max}$ of the target interval, only a very small ‰-proportion of pixels are saturated. After this, it is possible to specify the final offset OFF3' for the dark end of the histogram, i.e., now OFF3'=OFF1'+OFF2'.

On the other hand, if the condition examination (801) stated above is not implemented, a move is made to the next condition examination (802.2). In it, an investigation is made as to whether satPrm>=sat_L_min, in which sat_L_min=150‰, there thus being a preset limit value for the per mil proportion of pixels to be saturated at the lower limit $L_{min}$ of the target interval. If the condition (802.2) is true, the offset is specified as OFF2'=$L_{min}$–$L_{max}$, which is now negative (802.4). Thus, when calculating the final offset OFF3', the lower limit $L_{min}$ of the target interval is set to be the target level $L_{tgt}$ of the special value $R_{low}$.

On the other hand, if this condition examination too (802.2) is not carried out, then offset OFF2' is specified applying the limit points $L_{min}$, $L_{max}$ specifying the target interval, the per mil proportion satInd of pixels to be saturated, and the largest and smallest per mil proportions set in the limit points for the pixels to be saturated (802.3). In this equation, a point such that it will correspond to the per mil proportion satPrm of the pixels to be saturated in this target interval, if the saturation per mil proportions at the limit points of the target interval have been preset, is specified from the target interval of the limit points $L_{min}$ and $L_{max}$. Now, a final second offset OFF3' is also calculated, according to which the special value $R_{low}$ is guided, i.e. OFF3'=OFF1'+OFF2' (803). In this case too, OFF2' is negative, so that the location of the point $R_{low}$, according to the guidance, according to the offset OFF3' made for it, is set in the target interval between the points $L_{min}$ and $L_{max}$.

When using offset OFF3', a new value is then calculated for the exposure parameters ET, AG, by means of which the special value $R_{low}$ of the darkest end is made to move beneath the upper limit $L_{max}$ set for it. After this, it is possible to move to the calculation of the exposure parameters, as is also done in the cases according to image shots 1 and 2 (804). In the calculation, the total mutual ratio between the analog gain AG and the exposure time ET, and the stability of the adjuster are specified. From this point on, the operations for calculating the exposure parameters ET, AG will be obvious to one versed in the art, so that there is no need to describe them in relation to the method of the invention.

Taken roughly, it is possible to state that, in the adjustment portion of the parameters ET, AG, the coefficient C level can be calculated using the definition level and the found offset (for example, $C=(R_{high}+OFF3/R_{high})$. Once the coefficient C has been calculated, the reference number V depicting the lighting level in the viewfinder image is altered by multiplying it by the previous reference number V. The reference number (V) can be, for example, the result of the exposure time ET and the analog gain AG ($V=ET*AG$). The exposure time ET can be stated, for example, in microseconds and the gain AG as a coefficient value, being, for example 4× in situation 4. Thus, a new reference value V' ($V'=C*V$) is obtained. With the aid of this new reference value V', it is possible to seek from the table suitable values of the parameters ET and AG for the relevant reference value V'.

Once new values have been calculated for the exposure parameters ET, AG, a new viewfinder frame is taken using these values (401) and the method according to the invention is applied in the manner described above. After a couple of iteration cycles, there is no longer any substantial change in the histogram formed from a raw data of an individual viewfinder frame, if the lighting circumstances of the viewfinder frame haven't been changed. When the user presses the trigger button, the exposure parameters ET, AG of the viewfinder image at that moment are locked, and the shot/video stream then captured from the sensor 13 is taken to be processed in the imaging chain 10 shown in FIG. 10.

The exposure adjustment system according to the invention is thus iterative. The exposure parameters ET, Ag can thus be updated continuously. When the user presses the trigger button of the camera, the exposure parameters are calculated for the last time and the image is taken or videoing is performed. The exposure parameters ET, AG are locked, whether they converge at an optimal level or not. The parameters are updated continuously, as the user may turn the camera and aim at different objects. As a result, the desired exposure parameters generally change continuously. In the camera software, the exposure parameter calculating functionality can be called, for example, for each viewfinder frame, (for example, 15 times a second). On the other hand, it is also possible to use the so-called "half press" function. In that case, the exposure parameters can be calculated iteratively only once the user has aimed at the desired image object and pressed the trigger button halfway.

FIG. 10 shows the system and device 10 according to the invention. The structure of the digital imaging chain, which can also be implemented in several different variations, will, as such, be obvious to one versed in the art 25 thus there is no need to describe it further in this connection. Before the image is stored in the mass memory 17 or other kind of memory of the device, the imaging chain can comprise several modular components, examples of which are itemized in FIG. 10.

The exposure-control module 11 applying the method according to the invention can be arranged quite simply in this imaging chain and in connection with the sensor 13. In the method, the histogram is analyzed in the same way for each frame. This achieves particular advantages in the AEC adjustment of the image viewfinder/video. As a result of pressure on the trigger button, the viewfinder frame exposure parameters at that moment, which have already been defined, are locked. Thus, the invention is not used only for taking a still image or video clip, but also for the exposure of the viewfinder frame, so that at the stage at which it is wished to take the image, suitable exposure values have already been calculated. This is an important advantage when achieving a rapid response time. Correspondingly, "half press" can also be used.

The viewfinder frame is always produced using some exposure parameters ET, AG, of which there must generally always be information on the algorithm 11 adjusting the exposure. A calculation cycle for a new parameter ET, AG is not commenced until the sensor 13 has produced a viewfinder frame 12 using the new parameters ET, AG. This means that the method according to the invention is not necessarily implemented for each viewfinder frame 12 produced by the sensor 13, instead some frames may be missed out before a new definition. In certain situations, the sensor 11 may also modify the parameter values ET, AG for some reason. One reason for this can be hardware limitations. In such a case, the exposure parameters ET, AG may not necessarily be the same as those that the algorithm 11 has produced.

Further, note must be made of the fact that recording imaging may have to be commenced, even though the special values $R_{high}$, $R_{low}$ have not yet converged to the target level $H_{tgt}$, $L_{tgt}$ (i.e. the parameters ET, AG are not yet fully optimal). In that case, imaging takes place according to the latest parameters ET, AG, which, however, already represent to some extent the estimated optimal parameters ET, AG, compared, for example, to the prior art.

The exposure parameters ET, AG are thus adjusted through the iteration cycles of their viewfinder frames as many times as required, until their histogram is that desired. The processing of histograms can be continued, even though the exposure parameters ET, AG would be as set. This makes it possible to detect, the need to readjust the exposure, for example, due to a change in the shooting direction of the sensor 13, or a change in lighting conditions.

The method according to the invention can be applied equally well when the exposure parameters ET, AG should be increased and also when the exposure parameters ET, AG should be reduced. In addition, it should be noted that the method can also be applied in applications without a viewfinder, or in case, in which the viewfinder 12 is not switched on. In these cases too, the most suitable exposure parameters ET, AG can be calculated prior to commencing actual imaging operation.

Concerning FIGS. 1-3, it should be noted that the offsets OFF1, OFF2 of the other characteristic and special values that arise as a result of the guiding of the special values are, in reality, of different magnitudes, even though due to their similarity they are described using the same offset identifiers.

It must be understood that the above description and the related figures are only intended to illustrate the method according to the present invention. The invention is thus in no way restricted to only the embodiments disclosed above or stated in the Claims, but many different variations and adaptations of the invention, which are possible within the scope on the inventive idea defined in the accompanying Claims, will be obvious to one versed in the art.

The invention claimed is:

1. A method for adjusting exposure in digital imaging, the method comprising:
  capturing a raw image frame corresponding to given exposure parameters by a camera sensor;
  forming a histogram from the raw image frame;
  specifying a plurality of characteristic values from the histogram, including at least a first characteristic value being at least partly based on a mean value of the histogram and a second characteristic value indicating substantially the bright end of the histogram;

setting at least a minimum target level for the first characteristic value and a dynamic target interval for the second characteristic value;

comparing the first characteristic value to its minimum target level and the second characteristic value to its dynamic target interval;

in response to either the first characteristic value not exceeding its minimum target level or the second characteristic value not locating within its dynamic target interval, calculating a total offset required to guide the first characteristic value to exceed its minimum target level and the second characteristic value to locate within its dynamic target interval; and adjusting the exposure parameters on the basis of the first and second characteristic value biased by the total offset.

2. A method according to claim 1, further comprising specifying a third characteristic value from the histogram, indicating the point of the histogram wherein substantially 5-35%, preferably 20% of the pixels in the histogram are brighter than said point; and setting a dynamic target interval for the third characteristic value.

3. A method according to claim 2 further comprising setting upper and lower limits specifying the dynamic target intervals.

4. A method according to claim 1, wherein the dynamic target intervals are specified according to the dynamic characteristics of the camera sensor.

5. A method according to claim 1, wherein said characteristic values of the histogram are specified according to its pixel portions/distribution.

6. A method according to claim 1 further comprising specifying a first offset for the second characteristic value, by means of which it is guided to the target interval set for it, estimating a mean value resulting from the said guiding, and comparing it with a target interval set for it, if the estimated mean value is not guided to the target interval, specifying a second offset for the second characteristic value, such that the estimated mean value is guided to the target interval set for it;

wherein the sum of the first offset and the second offset represents the total offset used in adjusting the exposure parameters.

7. A method according to claim 1, wherein prior to the adjustment of the exposure parameters, the method further comprises making an examination as to whether a saturation condition set as a result of the guiding made for the second characteristic value is met;

if it is met, then the total offset is specified for the third characteristic value, by means of which the third characteristic value is guided to the target interval set for it and which total offset meets saturation criteria set for the target interval, and after which the said exposure parameters are specified on the basis of the third characteristic value and of the offset specified for it.

8. A method according to claim 7, wherein if the saturation condition is not met, then the total offset is specified for the second characteristic value, by means of which it is guided to upper limit of the target interval set for it, and after which the said exposure parameters are specified on the basis of the second characteristic value and of the offset specified for it.

9. A method according to claim 1, wherein the histogram is formed from the raw image frame, only ¹/₁₀-⁹/₁₀ part of the data is recorded, preferably ⅛ of the data.

10. A method according to claim 9, wherein the brightness value of the brightest pixel from a predefined pixel neighbourhood is recorded from the raw image frame into the histogram.

11. A method according to claim 1, wherein the second characteristic value is specified in such a way that 95-99.9% of the pixels of the histogram have a brightness value that is preferably darker than the second characteristic value.

12. A method according to claim 1, wherein the dynamic target intervals and their upper and lower limits target are modified according to the ambient light level.

13. A method according to claim 12, wherein the ambient light level is estimated on the basis of the previous exposure parameters.

14. A system in a digital imaging chain, the system including:

a camera sensor for capturing a raw image frame corresponding to given exposure parameters;

a plurality of modular components for processing the image data, including an exposure-control module for adjusting the exposure parameters; the system being arranged to form a histogram from the raw image frame;

specify a plurality of characteristic values from the histogram, including at least a first characteristic value being at least partly based on a mean value of the histogram and a second characteristic value indicating substantially the bright end of the histogram;

set at least a minimum target level for the first characteristic value and a dynamic target interval for the second characteristic value;

compare the first characteristic value to its minimum target level and the second characteristic value to its dynamic target interval;

in response to either the first characteristic value not exceeding its minimum target level or the second characteristic value not locating within its dynamic target interval, calculate a total offset required to guide the first characteristic value to exceed its minimum target level and the second characteristic value to locate within its dynamic target interval; and adjust the exposure parameters on the basis of the first and second characteristic value biased by the total offset.

15. A digital imaging device comprising the system according to claim 14.

* * * * *